(12) United States Patent
Amamiya et al.

(10) Patent No.: US 11,796,501 B2
(45) Date of Patent: Oct. 24, 2023

(54) GLASS ELECTRODE AND LIQUID PROPERTY MEASUREMENT DEVICE

(71) Applicant: ATAGO CO., LTD, Tokyo (JP)

(72) Inventors: Hideyuki Amamiya, Tokyo (JP); Yoshiaki Torigoe, Tokyo (JP); Akiho Sakuma, Tokyo (JP); Jun Ohsuga, Kanagawa (JP)

(73) Assignee: ATAGO CO., LTD., Tokyo (JP)

( * ) Notice: Subject to any disclaimer, the term of this patent is extended or adjusted under 35 U.S.C. 154(b) by 108 days.

(21) Appl. No.: 16/620,670

(22) PCT Filed: Jun. 11, 2018

(86) PCT No.: PCT/JP2018/022203
§ 371 (c)(1),
(2) Date: Dec. 9, 2019

(87) PCT Pub. No.: WO2018/230497
PCT Pub. Date: Dec. 20, 2018

(65) Prior Publication Data
US 2021/0140914 A1    May 13, 2021

(30) Foreign Application Priority Data
Jun. 12, 2017 (JP) ................. 2017-115124

(51) Int. Cl.
*G01N 27/36* (2006.01)
*G01N 27/30* (2006.01)

(52) U.S. Cl.
CPC .......... *G01N 27/36* (2013.01); *G01N 27/302* (2013.01)

(58) Field of Classification Search
CPC .... G01N 27/36; G01N 27/302; G01N 27/333; G01N 27/416
See application file for complete search history.

(56) References Cited

U.S. PATENT DOCUMENTS 3,448,032 A * 6/1969 Settzo ................ G01N 27/3335
  204/417
3,502,560 A * 3/1970 Wise .................. G01N 27/3335
  204/417

(Continued)

FOREIGN PATENT DOCUMENTS

EP         0193909 A2    9/1986
EP         0 351 516 A2  5/1989

(Continued)

OTHER PUBLICATIONS

Okada et al. (JPS60108327A, Machine Translation). (Year: 1985).*

(Continued)

*Primary Examiner* — Joshua L Allen
(74) *Attorney, Agent, or Firm* — Sughrue Mion, PLLC (57) ABSTRACT

A glass electrode is capable of measuring a cation concentration of a test solution. The glass electrode includes a flat sensitive glass body sensitive to ions, a base body formed of a glass tube housing an internal solution, and a fixation layer used to sealingly attach the sensitive glass body to an end surface of the base body. A resistance value of the fixation layer is equal to or higher than a resistance value of the sensitive glass body. A liquid property measurement device is equipped with the glass electrode.

4 Claims, 8 Drawing Sheets

(56) References Cited

U.S. PATENT DOCUMENTS

| | | | | |
|---|---|---|---|---|
| 3,578,579 | A | * | 5/1971 | Hebert ............... G01N 27/36 204/435 |
| 3,598,713 | A | * | 8/1971 | Baum ............... G01N 27/3335 204/417 |
| 3,671,413 | A | * | 6/1972 | Wise ............... G01N 27/3335 204/417 |
| 4,028,196 | A | * | 6/1977 | Young ............... C03C 3/076 205/787.5 |
| 4,321,544 | A | | 3/1982 | Riseman |
| 4,459,199 | A | * | 7/1984 | Fletcher, III ......... G01N 27/333 204/415 |
| 10,036,718 | B2 | | 7/2018 | Yamanouchi |
| 2005/0034984 | A1 | * | 2/2005 | Iwamoto ............... G01N 27/36 204/420 |
| 2009/0032396 | A1 | | 2/2009 | Woodward et al. |
| 2010/0179046 | A1 | | 7/2010 | Iwamoto et al. |
| 2010/0182022 | A1 | * | 7/2010 | Lee ............... G01N 27/36 324/693 |

FOREIGN PATENT DOCUMENTS

| | | | | |
|---|---|---|---|---|
| EP | 3128319 | A1 | 2/2017 | |
| JP | 56-132557 | A | 10/1981 | |
| JP | 60-108327 | A | 6/1985 | |
| JP | 60108327 | A * | 6/1985 | ....... C03B 37/01807 |
| JP | 2-147050 | A | 6/1990 | |
| JP | H09-236576 | A | 9/1997 | |
| JP | 2001-337070 | A | 12/2001 | |
| JP | 2005-049190 | A | 2/2005 | |
| JP | 2011-232357 | A | 11/2011 | |
| JP | 2016-001163 | A | 1/2016 | |
| WO | 2015152219 | A1 | 10/2015 | |

OTHER PUBLICATIONS

Communication dated Feb. 15, 2021, from the European Patent Office in European Application No. 18818865.0.
International Search Report for PCT/JP2018/022203 dated Aug. 28, 2018 [{CT/ISA/210].

* cited by examiner

GLASS ELECTRODE AND LIQUID PROPERTY MEASUREMENT DEVICE

CROSS REFERENCE TO RELATED APPLICATIONS

This application is a National Stage of International Application No. PCT/JP2018/022203 filed Jun. 11, 2018, claiming priority based on Japanese Patent Application No. 2017-115124 filed Jun. 12, 2017 that are incorporated herein by reference.

TECHNICAL FIELD

The present invention relates to a glass electrode and a liquid property measurement device and particularly relates to a glass electrode which includes a sensitive glass body such as a glass membrane sensitive to ions and a liquid property measurement device which measures a cation concentration of a test solution by using this glass electrode.

RELATED ART

There is known a liquid property measurement device which measures a cation concentration of a test solution by using, as a measurement electrode, a glass electrode including an ion-sensitive glass membrane as a sensitive glass body.

For example, there is a pH measurement device which measures pH by using a glass electrode including a glass membrane sensitive to hydrogen ions.

An example of a glass electrode for pH measurement used in a pH measurement device is described in Patent Literature 1.

As described also in Patent Literature 1, the glass electrode has a straight rod shape with a glass membrane at a front end in appearance and the glass membrane at the front end which is a sensitive body is formed to protrude as a thin membrane with a semispherical or partially spherical shell shape.

In usage of the glass electrode, measurement is performed by immersing the front end side of the glass electrode having the glass membrane into a test solution put in a container.

CITATION LIST

Patent Literature

Patent Literature 1: Japanese Patent Application Publication No. 2016-001163

SUMMARY OF INVENTION

Problems to be Solved by the Invention

In a method of forming a glass membrane which is a sensitive body in a conventional glass electrode, first, glass with a predetermined structure which is a raw material of the glass membrane is melted. Then, a front end of a glass tube to be a base body is brought into contact with the molten glass to fuse the molten glass thereto. Next, air is blow in from the other end side of the glass tube to expand the molten glass into a predetermined shape such as, for example, a semispherical or partially spherical shell shape.

In this forming method, it is difficult to make the thickness and shape of the glass membrane uniform when multiple glass electrodes are manufactured. Moreover, this forming method is not suitable for mass production and cost is high. Accordingly, the glass electrode is desired to be improved in terms of production efficiency and cost reduction.

Moreover, since the glass membrane in the front end portion is formed to be thin and protrude in the semispherical or partially spherical shell shape, the glass membrane needs to be handled with care in the measurement and cleaning after the measurement.

As described above, the conventional glass electrode is desired to be improved such that it is made less breakable and easier to handle.

Such improvements are desired not only in the glass electrode for pH measurement but also in glass electrodes used to measure concentrations of other cations.

Accordingly, an object of the present invention is to provide a glass electrode and a liquid property measurement device which are less likely to break and can be easily handled and which can achieve improvements in production efficiency and cost reduction.

Solution to Problem

A glass electrode according to a first aspect of the present invention is a glass electrode capable of measuring a cation concentration of a test solution. The glass electrode includes: a flat sensitive glass body sensitive to ions; a base body formed of a glass tube housing an internal solution; and a fixation layer used to sealingly attach the sensitive glass body to an end surface of the base body. A resistance value of the fixation layer is equal to or higher than a resistance value of the sensitive glass body.

The sensitive glass body may be sensitive to hydrogen ions.

A liquid property measurement device according to a second aspect of the present invention is a liquid property measurement device configured to measure a cation concentration of a test solution. The liquid property measurement device includes: a glass electrode including a flat sensitive glass body sensitive to ions, a base body formed of a glass tube housing an internal solution, and a fixation layer used to sealingly attach the sensitive glass body to an end surface of the base body; and a test solution holding portion including a recess portion which has a bottom portion with a flat surface shape and which houses the test solution. The sensitive glass body is exposed in the bottom portion of the recess portion without forming a step.

A liquid property measurement device according to a third aspect of the present invention is a liquid property measurement device configured to measure a cation concentration of a test solution. The liquid property measurement device includes: a glass electrode including a flat sensitive glass body sensitive to ions, a base body formed of a glass tube housing an internal solution, and a fixation layer used to sealingly attach the sensitive glass body to an end surface of the base body; and a calculation unit configured to correct the cation concentration of the test solution obtained based on a potential of the glass electrode by using a correction value based on resistance values of the sensitive glass body and the fixation layer and output the corrected cation concentration as a measurement value.

In the liquid property measurement device according the second or third aspect of the present invention, the resistance value of the fixation layer may be equal to or higher than the resistance value of the sensitive glass body.

In the liquid property measurement device according to the second or third aspect of the present invention, the sensitive glass body may be sensitive to hydrogen ions.

Advantageous Effects of Invention

According to the glass electrode and the liquid property measurement device in the aspects of the present invention, it is possible to provide a glass electrode and a liquid property measurement device which are less likely to break and can be easily handled and which can achieve improvements in production efficiency and cost reduction.

DESCRIPTION OF EMBODIMENTS

A liquid property measurement device according to an embodiment of the present invention is described by using a pH meter 51 of Example 1 and a pH meter 52 of Example 2. The pH meters 51, 52 are devices which measure pH indicating hydrogen ion concentration of a test solution, given as examples of a liquid property measurement device which measures cation concentration of the test solution.

Example 1

Figure 1:
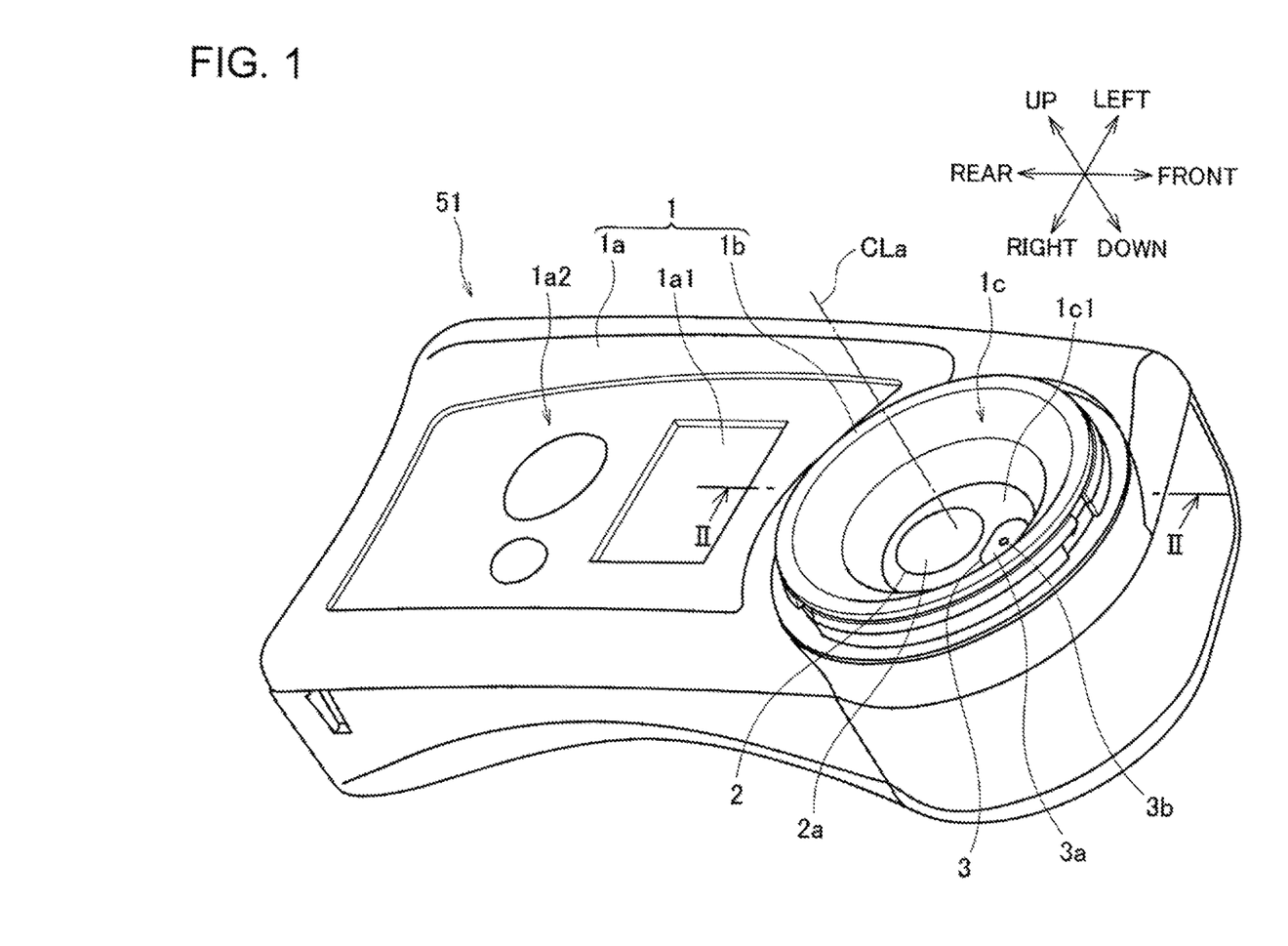
FIG. 1 is an external perspective view for explaining a pH meter 51 which is Example 1 of a liquid property measurement device according to an embodiment of the present invention.

In FIG. 1, the pH meter 51 is a handy-type pH meter with a case 1 which can be held by one hand. For the sake of description, directions of up, down, left, right, front, and rear are defined to be directions of arrows illustrated in FIG. 1.

The case 1 includes a main body portion 1a which is formed in a substantially rectangular solid shape being thin in the up-down direction and a stage portion 1b which is formed in a front portion of the main body portion 1a and which protrudes upward in an annular shape to be visible.

A display unit 1a1 configured to display a measurement result, an operation mode, and the like and an operation portion 1a2 formed of buttons and the like to be operated by a user are provided on an upper surface of the main body portion 1a.

The stage portion 1b includes a holding portion 1c for the test solution on the inner side thereof. The test solution holding portion 1c is a recess portion with a substantially truncated cone shape which is formed about an axis CLa extending in the up-down direction and is smoothly connected to an upper end surface of the stage portion 1b and which has a diameter becoming smaller toward the lover side. A bottom portion of the test solution holding portion 1c is a bottom surface portion 1c1 with a shape of a circular flat surface orthogonal to the axis CLa.

A circular glass membrane portion 2a provided at an end portion of a glass electrode 2 and an ellipsoidal end surface of a liquid junction unit 3 are arranged in the bottom surface portion 1c1 to be exposed.

The glass membrane portion 2a is a flat sensitive glass body with, for example, a diameter of 10 mm and a thickness of 0.5 mm. The external shape and the thickness are not limited to those described above. In the following description, the sensitive glass body is referred to as glass membrane portion for the sake of convenience.

The glass membrane portion 2a is an ion-sensitive flat-plate shaped member and the glass membrane portion for the glass electrode 2 mounted in the pH meter 51 is formed to have a publicly-known composition which can provide hydrogen ion sensitivity.

The center of the glass membrane portion 2a is at a position slightly offset toward the rear side with respect to the axis CLa. The liquid junction unit 3 has an ellipsoidal shape elongating in the left-right direction and is located in front of the glass membrane portion 2a.

An upper surface 2a1 of the glass membrane portion 2a and an upper surface 3a of the liquid junction unit 3 form surfaces at the same height as the bottom surface portion 1c1 without forming a step.

An end surface of a rod-shaped liquid junction portion 3b made of porous ceramic is exposed at the center of the upper surface 3a of the liquid junction unit 3.

Figure 2:
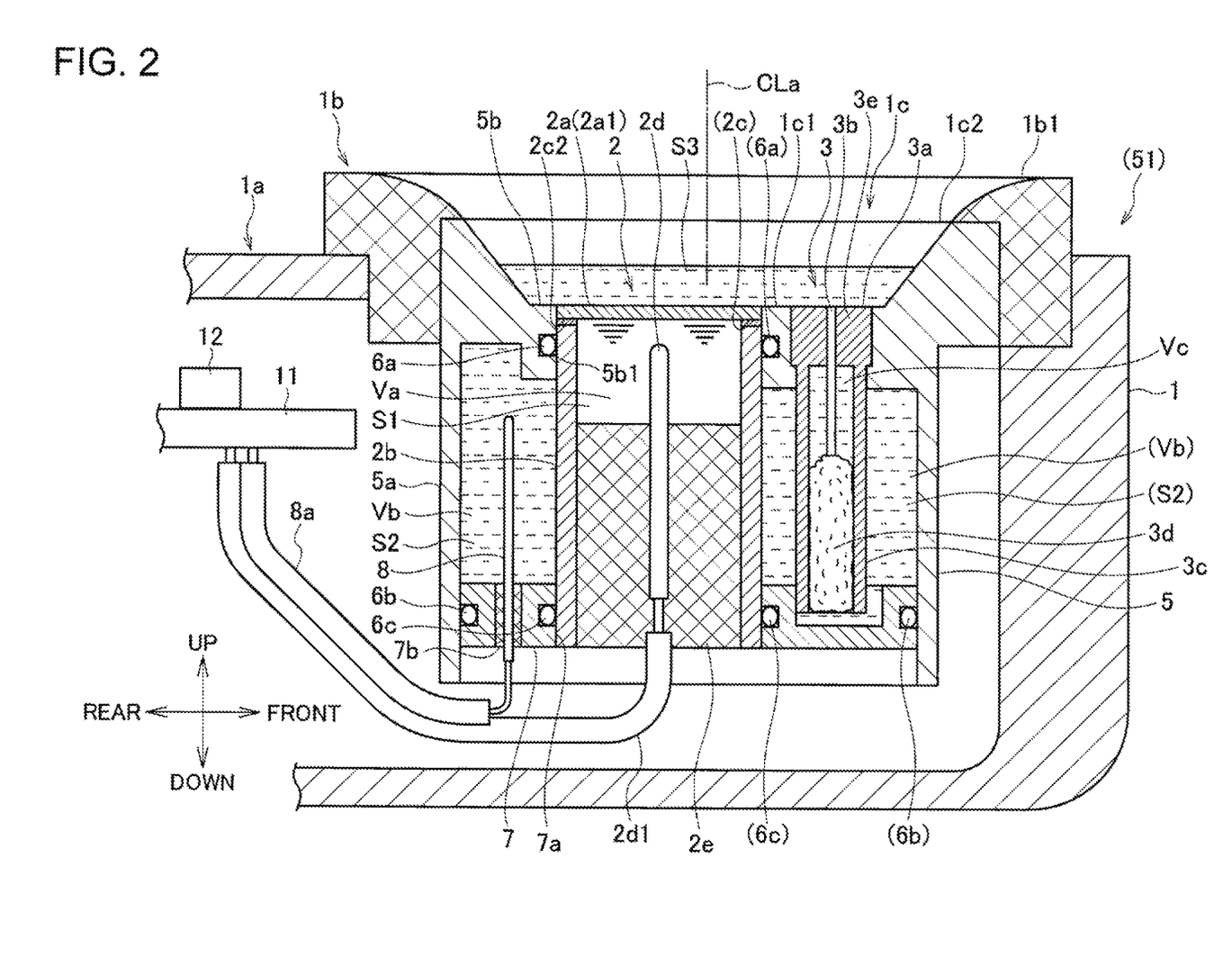
FIG. 2 is a partial cross-sectional diagram for explaining a stage portion 1b in the pH meter 51.

FIG. 2 is a cross-sectional view taken along a line perpendicular to the left-right direction at the position II-II in FIG. 1 to explain an internal structure of the stage portion 1b.

As illustrated in FIGS. 1 and 2, the stage portion 1b includes an annular stage frame portion 1b1 which protrudes upward from an upper surface of the main body portion 1a of the case 1 and a bottomed cylindrical electrode housing 5 which is attached to the stage frame portion 1b1 from below inside the case 1 to be integral therewith.

The electrode housing 5 includes a cylindrical peripheral wall portion 5a and a top wall portion 5b provided above the peripheral wall portion 5a and is formed in a bottomed cylindrical shape open on the lower side. Substantially the lower half of the test solution holding portion 1c and the bottom surface portion 1c1 have a flat surface shape and are formed as part of the top wall portion 5b of the electrode housing 5.

A bottom lid 7 is attached to a lower end of an inside of the electrode housing 5.

The bottom lid 7 is fixed to a lower portion of an inner surface of the peripheral wall portion 5a in a water-tight manner with a gap therebetween sealed by an O-ring 6b.

The bottom lid 7 supports a rod-shaped reference electrode 8 via a sealing member 7b such that the reference electrode 8 extends in the up-down direction.

The electrode housing 5 supports the columnar glass electrode 2 and liquid junction unit 3 such that the axes of the glass electrode 2 and the liquid junction unit 3 extend in the up-down direction.

Specifically, the glass electrode 2 is supported on both sides by the top wall portion 5b and the bottom lid 7 and the liquid junction unit 3 is supported on one side by the top wall portion 5b.

The glass electrode 2 is attached to the top wall portion 5b and the bottom lid 7 in an water-tight manner such that a gap between the glass electrode 2 and an attachment hole 5b1 formed in the top wall portion 5b is sealed by an O-ring 6a and a gap between the glass electrode 2 and an attachment hole 7a formed in the bottom lid 7 is sealed by an O-ring 6c.

An internal solution holding vessel Vb of the reference electrode 8 is thereby formed inside the electrode housing 5 as a space surrounded by the peripheral wall portion 5a, the top wall portion 5b, and the bottom lid 7 and excluding the glass electrode 2 and the liquid junction unit 3. The reference electrode 8 is arranged in the internal solution holding vessel Vb of the reference electrode 8.

Next, the glass electrode 2 and the liquid junction unit 3 are described in detail.

Glass Electrode 2

The glass electrode 2 is formed in a cylindrical shape. Specifically, the glass electrode 2 includes a base body 2b which is a glass tube, the glass membrane portion 2a which is a sensitive body attached to one end surface (upper surface in FIG. 2) of the base body 2b with a fixation layer 2c2 to close the one end surface, and a sealing portion 2e which seals the other end side (lower side) of the base body 2b. Moreover, the glass electrode 2 includes a rod-shaped inner electrode 2d which is supported by the sealing portion 2e to face the glass membrane portion 2a while extending in the up-down direction.

The glass electrode 2 has an internal solution holding vessel Va of the glass electrode 2 as a space surrounded by the glass membrane portion 2a, the fixation layer 2c2, the base body 2b, and the sealing portion 2e.

The internal solution holding vessel Va of the glass electrode 2 is filled with an internal solution S1 (for example, saturated KCl) of the glass electrode 2 and a front end portion of the inner electrode 2d is in the internal solution S1 of the glass electrode 2.

A cable 2d1 is led out from the inner electrode 2d and the other end of the cable 2d1 is connected to a circuit board 11 housed in the main body portion 1a.

A method of manufacturing the glass electrode 2 is described with reference also to FIG. 3.

In the manufacturing of the glass electrode 2, the glass membrane portion 2a and the base body 2b are prepared.

First, a glass round bar with a predetermined diameter and a composition publicly-known as a material of a hydrogen ion sensitive membrane is produced as a material of the glass membrane portion 2a.

Figure 3:
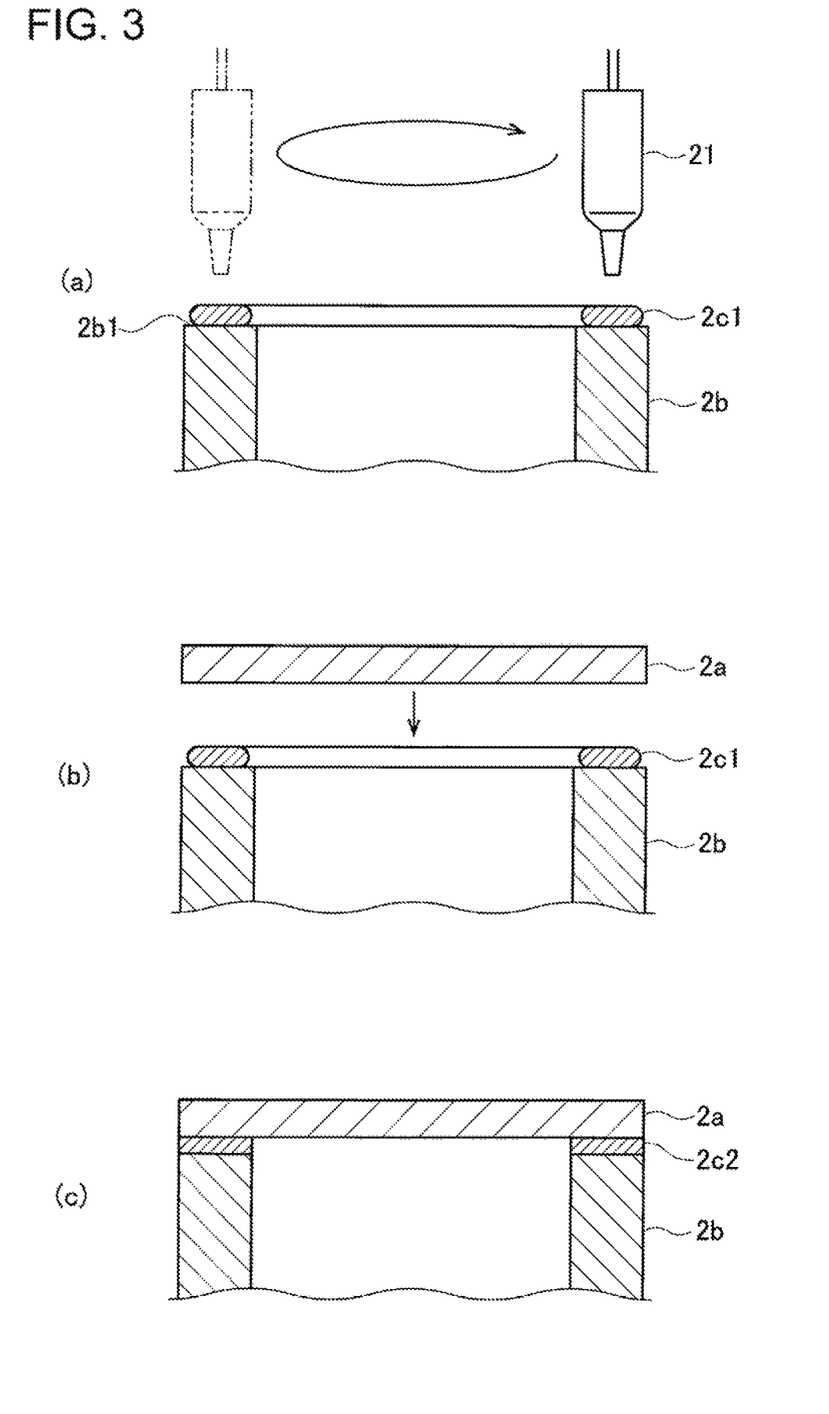
FIG. 3 is a partial cross-sectional diagram for explaining a method of manufacturing a glass electrode 2 which is Example 1 of a glass electrode according to the embodiment of the present invention, part (a) is a diagram illustrating a step of applying glass paste 2c, part (b) is a diagram illustrating a step of placing c glass membrane portion 2a, and part (c) is a diagram explaining a state after sintering of the glass paste 2c.

Then, this glass round bar is sliced to a predetermined thickness and a sliced piece is subjected to surface polishing as necessary to obtain the glass membrane portion 2a with a thin circular plate shape (part (b) of FIG. 3).

Meanwhile, the base body 2b is obtained by cutting a thick glass tube with a predetermined diameter to a predetermined length.

When the glass membrane portion 2a and the base body 2b are prepared, as illustrated in part (a) of FIG. 3, a glass paste 2c is applied to one end surface 2b1 of the base body 2b by using a dispenser 21 or the like. In this case, the glass paste 2c before sintering which is soft enough to be applied with the dispenser 21 is referred to as glass paste 2c1.

Next, as illustrated in part (b) of FIG. 3, the glass membrane portion 2a is placed on the applied glass paste 2c1 and is pressed against the glass paste 2c1 at predetermined force. The glass paste 2c1 is thereby disposed between the glass membrane portion 2a and the base body 2b to be in tight contact therewith. In this case, the end surface 2b1 of the base body 2b and the upper surface 2a1 of the glass membrane portion 2a are made not to tilt so as to be surfaces parallel to each other.

Next, the base body 2b and the glass membrane portion 2a attached to the base body 2b via the glass paste 2c1 by the adhesiveness of the glass paste 2c1 are sintered in a sintering profile including a predetermined temperature change and a predetermined change over time. As illustrated in part (c) of FIG. 3, the glass paste 2c1 thereby turns into the fixation layer 2c2 which is a mode after the sintering.

The glass paste 2c1 is a so-called low-temperature sintering type (for example, the sintering temperature is 500° C. or lower) glass paste and is a glass paste whose resistance value R2c2 after the sintering is equal to or higher than the resistance value Ra of the glass membrane portion 2a.

Since the glass paste 2c is the low-temperature sintering type glass paste, the base body 2b and the glass membrane portion 2a are integrally sealingly attached to each other using the fixation layer 2c2 without properties and the like thereof changing.

The base body 2b to which the glass membrane portion 2a is attached is set to a position in which the glass membrane portion 2a is on the lower side, and the internal solution S1 of the glass electrode 2 is injected into the inside of the base body 2b. Moreover, the inner electrode 2d is immersed into the internal solution S1 and the internal solution S1 of the glass electrode 2 is sealed by the sealing portion 2e with the base body 2b filled with the internal solution S1.

The glass electrode 2 is obtained by the manufacturing method described above.

Liquid Junction Unit 3

The liquid junction unit 3 includes a base body 3c which is formed in a long bottomed cylindrical shape and which has a bottom wall 3e as the bottom, the thin-rod shaped liquid junction portion 3b which is supported by the bottom wall 3e, and an absorbent cotton 3d which is housed in an interior space Vc of the base body 3c.

The liquid junction unit 3 is attached to the top wall portion 5b of the electrode housing 5 such that the bottom wall 3e is located on the upper side.

The lower end side of the base body 3c is open to the inside of the internal solution holding vessel Vb of the reference electrode 8 and the inside of the base body 3c is filled with an internal solution S2 with which the internal solution holding vessel Vb of the reference electrode 8 is filled.

The liquid junction portion 3b is made of porous ceramic. The liquid junction portion 3b maintains electrical connection between a test solution S3 held in the test solution holding portion 1c in the stage portion 1b and the internal solution S2 of the reference electrode 8 with which the interior space Vc is filled.

In this case, the liquid junction portion 3b and the absorbent cotton 3d only need to guide the internal solution S2 in the internal solution holding vessel Vb of the reference electrode 8 to the interior space Vc and the test solution S3.

Accordingly, a porous resin or the like may be used instead of the liquid junction portion 3b and the absorbent cotton 3d.

A cable 8a connected to the reference electrode 8 is lead out with water-tightness achieved by the sealing member 7b in the bottom lid 7 and is connected to the circuit board 11.

The circuit board 11 includes a calculation unit 12 which obtains pH from a potential difference between the electrically-connected inner electrode 2d and the reference electrode 8, through calculation by using a publicly-known method.

In the aforementioned configuration, the internal solution holding vessel Vb of the reference electrode 8 is provided with an internal solution injection port (not illustrated) which can be opened and closed and, when the pH meter 51 is used, holds the internal solution S2 (for example, saturated KCl) of the reference electrode 8 to be filled with it. Injection (refilling) of the internal solution S2 of the reference electrode 8 may be made possible by making the base body 3c of the liquid junction unit 3 detachable toward the upper side and attachable again.

The pH meter 51 described above in detail measures pH of the test solution S3 while being placed on a desk or the like with the stage portion 1b facing upward.

Measurement steps and the like are specifically described.

The test solution S3 whose pH is to be measured is put into the test solution holding portion 1c of the stage portion 1b by being added dropwise or by other similar methods and the glass membrane portion 2a and the liquid junction portion 3b are made to be covered with one drop of the test solution S3.

The calculation unit 12 of the circuit board 11 obtains the pH value of the test solution S3 by a publicly-known pH value calculation method, based on a potential difference between the inner electrode 2d and the reference electrode 8 occurring due to immersing of the glass membrane portion 2a and the liquid junction portion 3b into the test solution S3.

Then, the obtained pH value is displayed on the display unit 1a1.

The pH value may be corrected by processing of the calculation unit 12. Processing including this correction is described later in detail after the explanation of Example 2.

In the aforementioned pH meter 51 which is the liquid property measurement device, the upper surface 2a1 of the glass membrane portion 2a and the bottom surface portion 1c1 of the stage portion 1b are provided to be flush without steps. This facilitates cleaning after the measurement and the test solution S3 is almost completely removed by cleaning and does not remain.

Accordingly, in the next measurement of a different test solution, there is no effect of the remaining measured test solution and measurement can be performed with high accuracy every time.

Moreover, in the liquid property measurement, the remaining test solution which is the measured sample affects the measurement accuracy. Furthermore, remaining liquid such as water used for cleaning may also affect the measurement result. Accordingly, cleaning of a portion holding the test solution needs to be surely performed such that there is no remaining substance.

In this regard, the pH meter 51 has no step in the bottom surface portion 1c1 and it is possible to surely and easily perform cleaning in which the test solution, the remaining liquid, and the like in the test solution holding portion 1c including the bottom surface portion 1c1 is removed with cloth or the like.

Furthermore, the glass membrane portion 2a has a flat plate shape and is sealingly attached to the end surface 2b1 of the base body 2b via the fixation layer 2c2 to be a surface parallel to the end surface 2b1. Accordingly, the glass membrane portion 2a is less likely to break than a thin glass membrane having a semispherical or partially-spherical shell shape protruding from a base body in a conventional glass electrode.

Moreover, the test solution holding portion 1c is the recess portion recessed in the substantially-truncated cone shape and the bottom surface portion 1c1 of the holding portion 1c is a flat electrode-exposed surface. Accordingly, there is no need to immerse a rod-shaped electrode into the test solution and the measurement can be performed with a small amount of test solution.

As described above, the pH meter 51 including the glass electrode 2 is easy to handle.

Moreover, the glass membrane portion 2a can be obtained by mechanical slicing without human work. In other words, the thickness and shape of the glass membrane portion 2a can be made uniform at a high degree and mass production is possible.

Accordingly, the configuration of the pH meter 51 can improve production efficiency and reduce cost.

Furthermore, in the glass electrode 2, the glass membrane portion 2a itself is not fused and, instead, the glass membrane portion 2a is fixed to the base body 2b by using the glass paste 2c which can be sintered at a temperature lower than the softening temperature of the glass membrane portion 2a and the base body 2b.

Accordingly, the glass membrane portion 2a is not affected on both sides by the sintering of the glass paste and the glass membrane portion 2a can exert physical and chemical characteristics imparted thereto in an excellent manner.

Moreover, an outer peripheral surface of the glass electrode 2 in a portion above the O-ring 6a sealing the gap between the glass electrode 2 and the attachment hole 5b1 comes into contact with the test solution S3.

Specifically, a portion of the base body 2b above the portion in contact with the O-ring 6a, the fixation layer 2c2 formed by sintering the glass paste 2c, and the glass membrane portion 2a come into contact with the test solution S3.

Accordingly, in order to prevent the resistance value $R2c2$ of the fixation layer 2c2 from affecting the measurement potential of the inner electrode 2d and reducing the measurement accuracy of the pH value, it is desirable that the resistance value $R2c2$ of the fixation layer 2c2 is equal to or higher than the resistance value Ra of the glass membrane portion 2a.

Example 2

Figure 4:
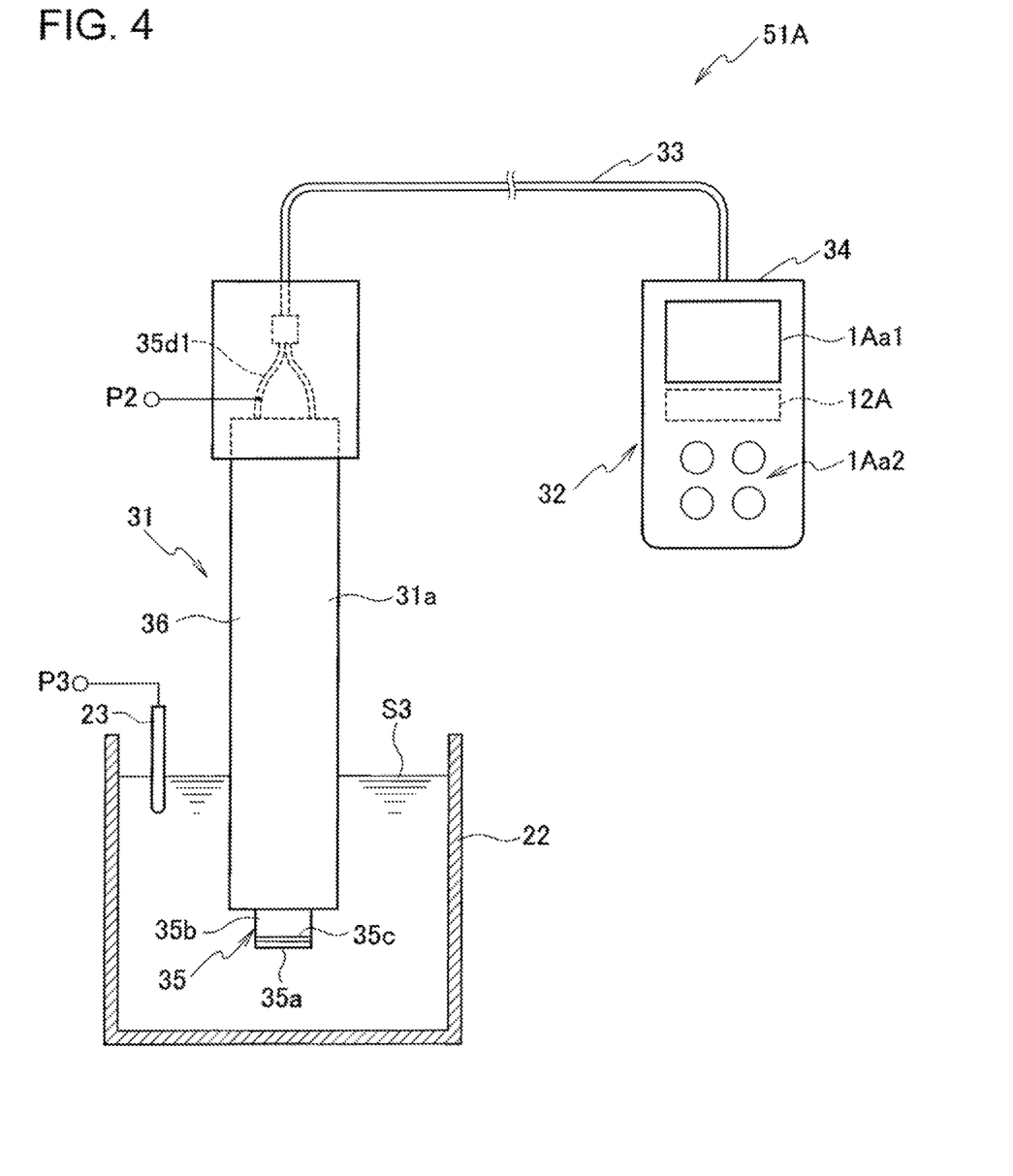
FIG. 4 is an overall configuration diagram for explaining a pH meter 51A which is Example 2 of the liquid property measurement device according to the embodiment of the present invention.

The pH meter 51A of Example 2 is described with reference to FIGS. 4 and 5. FIG. 4 is a diagram for explaining an overall configuration of the pH meter 51A and FIG. 5 is a partial cross-sectional view for explaining a configuration of an electrode portion 31 included in the pH meter 51A.

The pH meter 51A includes the rod-shaped electrode portion 31 and a measurement main body portion 34 connected to the electrode portion 31 by a cord 33.

The measurement main body portion 34 includes, on an outer surface, a display unit 1Aa1 which displays a measurement result, an operation mode, and the like and an operation portion 1Aa2 which is formed of buttons and the like to be operated by the user, and includes a calculation unit 12A inside itself.

Figure 5:
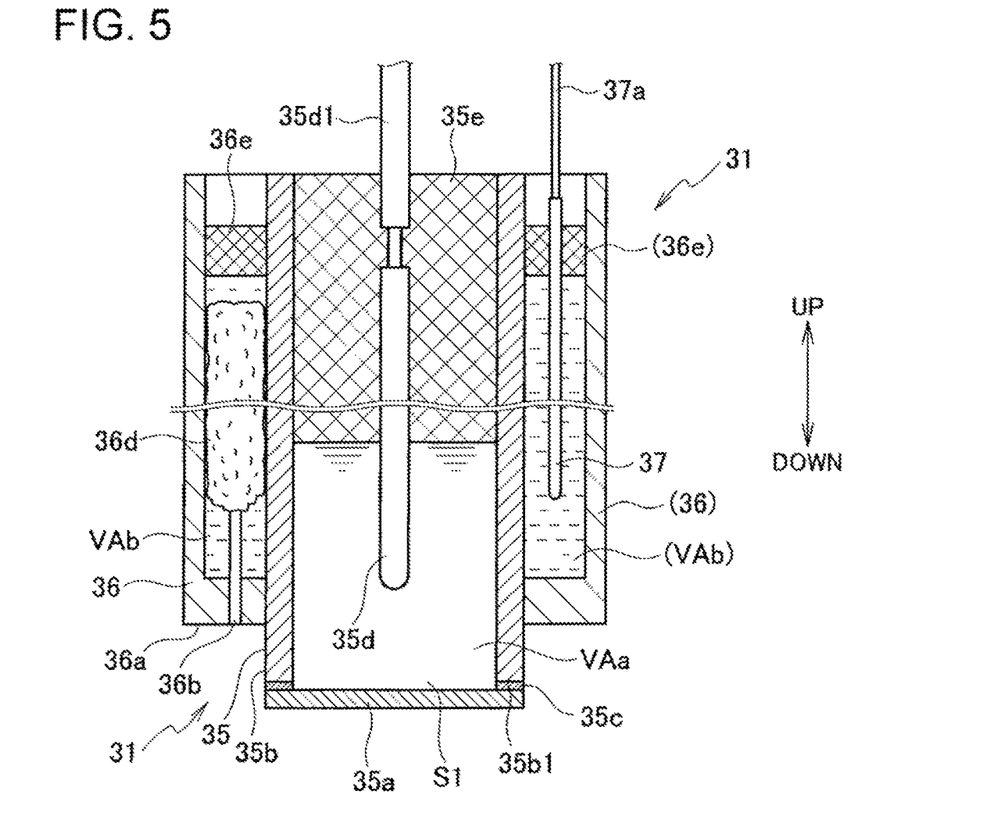
FIG. 5 is a partial cross-sectional diagram for explaining an electrode portion 31 included in the pH meter 51A.

As illustrated in FIG. 5, the electrode portion 31 includes a long cylindrical glass electrode 35 and an annular tube portion 36 which forms an annular internal solution holding vessel VAb of a reference electrode 37 outside the glass electrode 35. FIG. 5 illustrates the electrode portion 31 in a position standing upright in the up-down direction which is a position in the measurement of the electrode portion 31.

The glass electrode 35 is formed in a method similar to that of the glass electrode 2 and has a similar structure.

Specifically, the glass electrode 35 includes a base body 35b which is a glass tube, a glass membrane portion 35a which is a flat sensitive glass body attached to one end surface (lower surface in FIG. 5) of the base body 35b to close the one end surface, and a sealing portion 35e which seals the other end side (upper side in FIG. 5) of the base body 35b. Moreover, the glass electrode 35 includes a rod-shaped inner electrode 35d which is supported by the sealing portion 35e to face the glass membrane portion 35a while extending in the up-down direction.

The glass membrane portion 35a is integrally sealingly attached to an end surface 35b1 of the base body 35b via a fixation layer 35c obtained by sintering the glass paste 2c.

The glass electrode 35 has an internal solution holding vessel VAa of the glass electrode 2 as a space surrounded by the glass membrane portion 35a, the fixation layer 35c, the base body 35b, and the sealing portion 35e.

The internal solution holding vessel VAa of the glass electrode 35 is filled with the internal solution S1 (for example, saturated KCl) of the glass electrode 35 and a front end portion of the inner electrode 35d is in the internal solution S1 of the glass electrode 35.

A cable 35d1 is led out from a rear end portion of the inner electrode 35d and the other end of the cable 35d1 is connected to a calculation unit 12A (see FIGS. 4 and 6) in a circuit board (not illustrated) housed in the measurement main body portion 34.

A lower surface 36a of the annular tube portion 36 is located above the glass membrane portion 35a of the glass electrode 35 and is integrated with the glass electrode 35 in such a mode that the glass electrode 35 protrudes from the lower surface 36a to form a step.

The annular tube portion 36 forms the annular internal solution holding vessel VAb of the reference electrode 37 outside the glass electrode 35 in a radial direction thereof.

A thin-rod shaped liquid junction portion 36b is attached to the annular tube portion 36 to be exposed on the lower surface 36a and to extend in the up-down direction in the internal solution holding vessel VAb of the reference electrode 37. The liquid junction portion 36b is made of, for example, porous ceramic.

An absorbent cotton 36c is housed above the liquid junction portion 36b in the internal solution holding vessel VAb of the reference electrode 37.

An upper end of the internal solution holding vessel VAb of the reference electrode 37 is sealed by a ring-shaped sealing portion 36e.

In the internal solution holding vessel VAb of the reference electrode 37, the rod-shaped reference electrode 37 is attached while extending in the up-down direction.

The internal solution holding vessel VAb of the reference electrode 37 sealed by the sealing portion 36e is filled with the internal solution S2 of the reference electrode 37 (for example, KCl). Accordingly, the reference electrode 37 is immersed in the internal solution S2 of the reference electrode 37.

A cable 37a is lead out from the reference electrode 37 toward the upper side.

The cable 37a and the cable 35d1 from the inner electrode 35d are gathered and connected to the measurement main body portion 34 as a cord 33 (FIG. 4) extending from the electrode portion 31.

As illustrated in FIG. 4, in the pH meter 51A, pH measurement is performed by immersing the electrode portion 31 into the test solution S3 contained in a container 22 such as a beaker for the test solution S3 such that at least the liquid junction portion 36b and the glass membrane portion 35a are submerged in the test solution S3.

In this case, the liquid junction portion 36b maintains electrical connection between the test solution S3 and the internal solution S2 of the reference electrode 37 with which the internal solution holding vessel VAb of the reference electrode 37 is filled.

Regarding Correction of Measurement Value

Next, correction of the measurement value in the pH meter 51 of Example 1 and the pH meter 51A in Example 2 is described.

Figure 6:
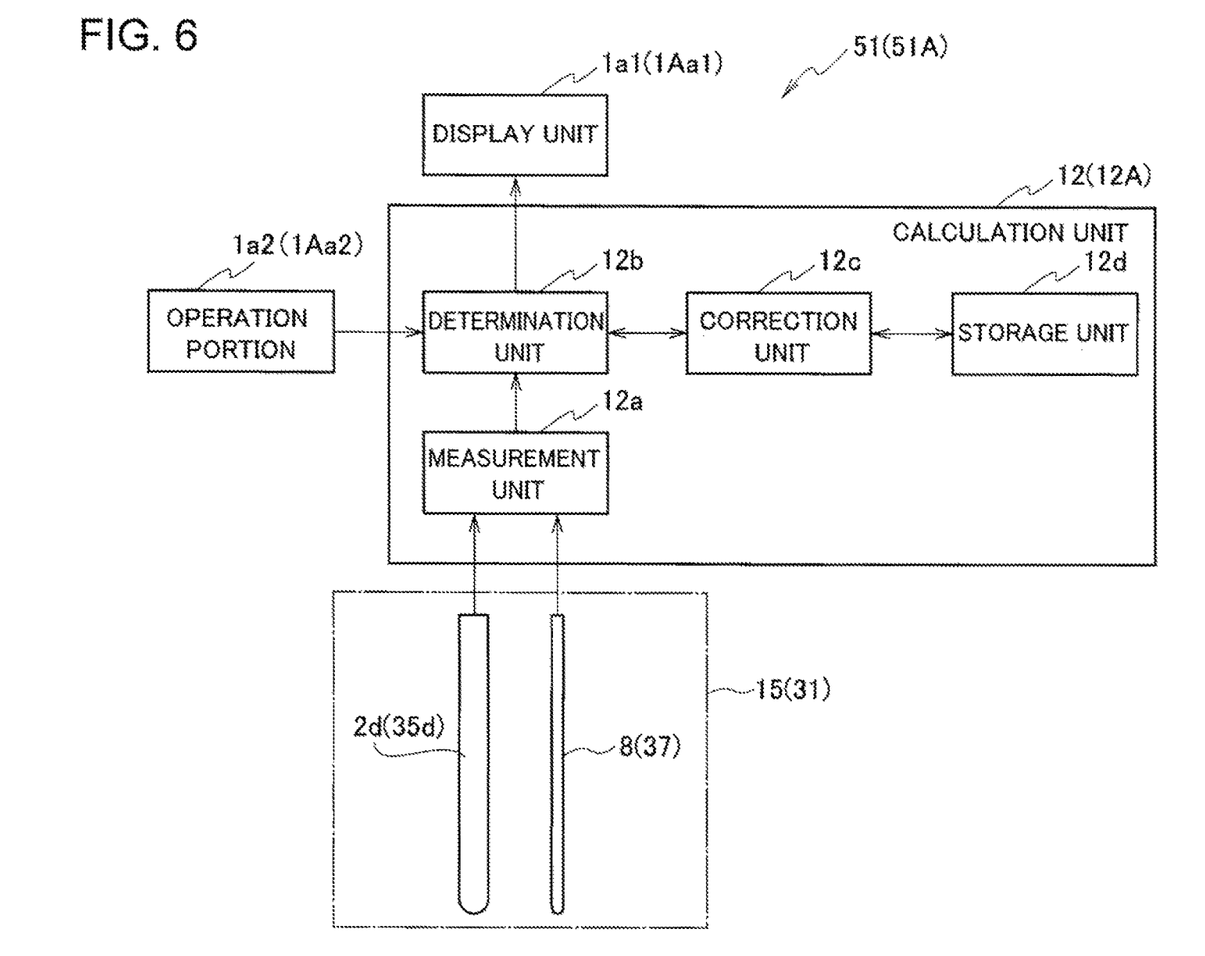
FIG. 6 is a block diagram for explaining a measurement system of the pH meters 51, 51A.

FIG. 6 is a block diagram explaining a measurement system of the pH meters 51, 51A. Reference numerals corresponding to the pH meter 51A described in parentheses and the measurement system of the pH meter 51A is the same as that of the pH meter 51. In the following description, the pH meter 51 is described as a representative.

The calculation unit 12 includes a measurement unit 12a which obtains a potential difference between the inner electrode 2d and the reference electrode 8 and a determination unit 12b which calculates the pH value based on the potential difference obtained by the measurement unit 12a by using a publicly-known calculation method.

Moreover, the calculation unit 12 includes a correction unit 12c which calculates a corrected pH value based on a later-described correction amount $\Delta$pH obtained in advance by performing measurement and a storage unit 12d which stores the correction amount $\Delta$pH and the like.

The determination unit 12b also controls operations of the entire pH meter 51.

An instruction inputted by the user or the like on the operation portion 1a2 is sent to the determination unit 12b and the operation is executed. Moreover, the determination unit 12b outputs the operation state and the obtained pH value to the display unit 1a1.

The correction amount $\Delta$pH is a value for correcting an individual difference in the sensitivity of the glass electrode 2.

The sensitivity of the glass membrane portion 2a and the resistance value of the fixation layer 2c2 sometimes slightly vary among individual glass electrodes 2.

By correcting such an individual difference, in the pH meter 51, measurement variation among products is suppressed and high quality is maintained.

The correction amount $\Delta$pH is calculated, for example, in the following method.

Figure 7:
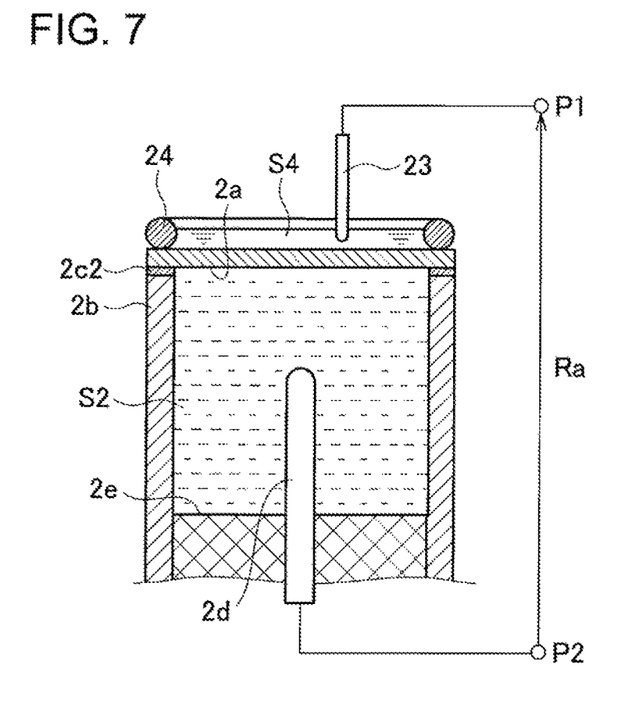
FIG. 7 is a first diagram for explaining a method of obtaining a correction value Mh in the pH meter 51.

First, a resistance value Ra corresponding to the resistance value between the inner surface and the outer surface of the glass membrane portion 2a alone is obtained in the method illustrated in FIG. 7.

Specifically, the glass electrode 2 is set to a position in which the glass membrane portion 2a is on the upper side, an O-ring 24 with substantially the same diameter as the base body 2b is placed on the glass membrane portion 2a, and the inside of the O-ring 24 is filled with water S4.

An electrode 23 is immersed into the water S4 in this state and a resistance value between the electrode 23 and the inner electrode 2d (between P1 and P2) is measured as the resistance value Ra. This value is, for example, about 850 (MΩ).

Figure 8:
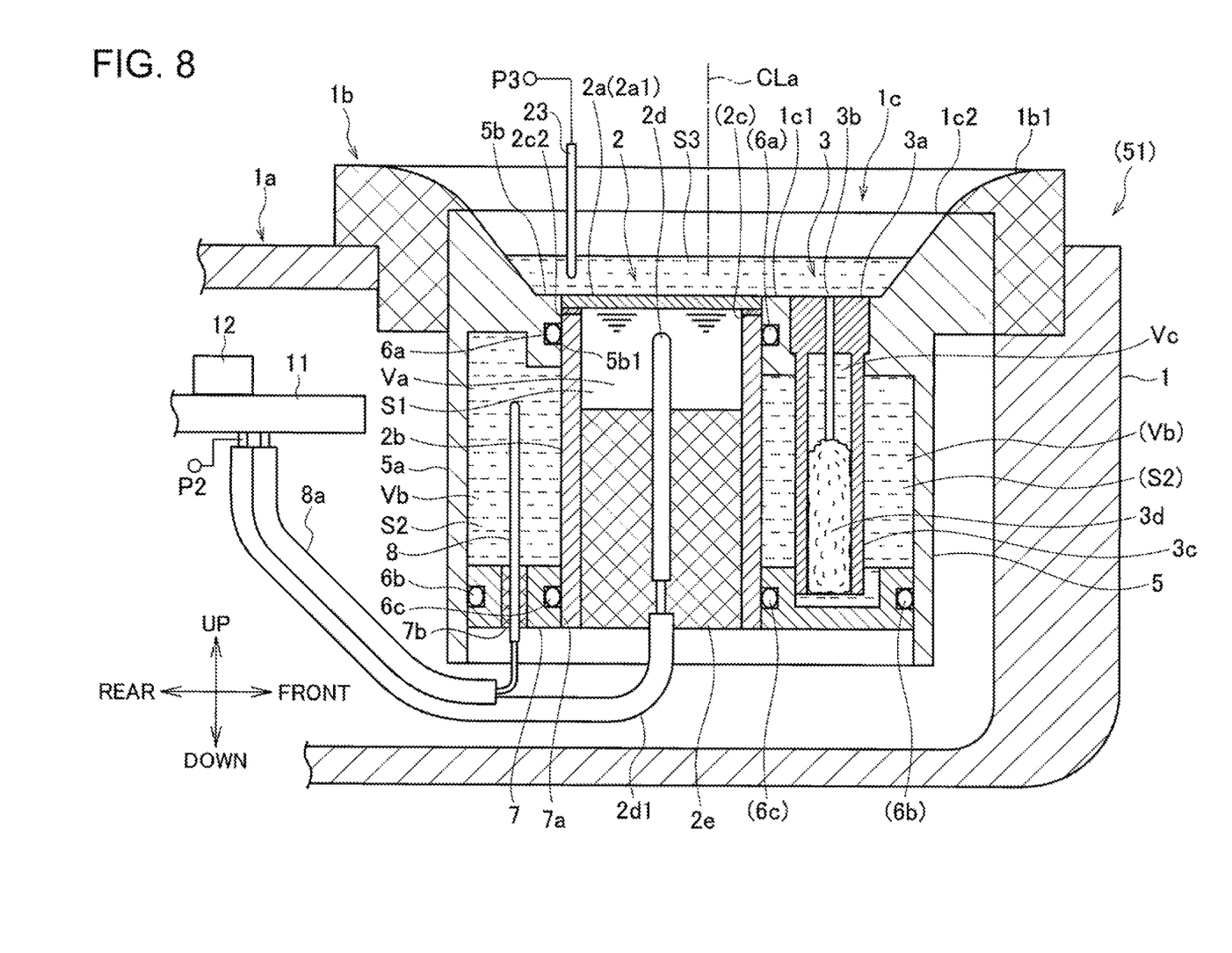
FIG. 8 is a second diagram for explaining a method of obtaining a correction value Mh in the pH meter 51.

Next, as illustrated in FIG. 8, the resistance value R2c2 is obtained which is substantially an electrical resistance value between the test solution S3 and the internal solution S2 of the reference electrode 37 in the fixation layer 2c2.

Specifically, a resistance value between the electrode 23 immersed in the test solution S3 and the inner electrode 2d (between P3 and P2) in a state where the pH meter 51 is measuring the pH value of the test solution S3 is measured as a combined resistance value R. In this case, the combined resistance value R can be expressed as $1/R=(1/Ra)+(1/R2c2)$ by using the resistance value Ra of the glass membrane portion 2a alone and the resistance value R2c2 of the fixation layer 2c2.

The base body 2b in contact with the test solution S3 and the internal solution S2 of the reference electrode 37 can be considered substantially as an insulator when the base body 2b is a glass tube. Meanwhile, when the fixation layer 2c2 is formed by sintering the glass paste 2c whose viscosity is adjusted such that the glass paste 2c is applicable at a room temperature, a leak current sometimes flows through the fixation layer 2c2 whose outer peripheral surface is in contact with the test solution S3 and whose inner peripheral surface is in contact with the internal solution S2 of the reference electrode 37. In other words, the combined resistance value R is sometimes smaller than the resistance value Ra. In this case, the combined resistance value R is, for example, about 700 (MΩ).

The resistance value R2c2 is calculated from the resistance value Ra and the combined resistance value R measured as described above.

A relationship between the obtained resistance value R2c2 and the correction amount ΔpH for each pH value in the resistance value R2c2 is obtained in advance, the correction amount ΔpH grasped by measurement using a reference test solution whose pH is determined in advance. Then, this relationship is stored in the storage unit 12d as, for example, a correction table Tm.

Moreover, in the manufacturing stage of the pH meters 51, the resistance value R2c2 of the fixation layer in each pH meter 51 measured in the aforementioned method is stored in the storage unit 12d.

The pH meter 51 executes the following correction processing when measuring pH of the test solution S3.

The determination unit 12b calculates a pH value Q based on the potential difference received from the measurement unit 12a by using a publicly-known pH value calculation method.

The determination unit 12b supplies the calculated pH value Q to the correction unit 12c.

The correction unit 12c refers to the correction table Tm stored in the storage unit 12d to read out a correction amount ΔpHq corresponding to the supplied pH value Q in the case where the resistance value of the fixation layer 2c2 is the resistance value R2c2 and sends the correction amount ΔpHq to the determination unit 12b.

The determination unit 12b adds the correction amount ΔpHq sent from the correction unit 12c to the calculated pH value, determines the obtained value as the corrected pH value, and displays the corrected pH value on the display unit 1a1.

The correction processing is specifically described.

For example, when the resistance value R2c2 of the fixation layer 2c2 in the pH meter 51 is 4000 (MΩ) and the pH value Q before correction calculated by the determination unit 12b is 6.35, the correction unit 12c refers to correction amount fields for the respective pH values in the case where the resistance value R2c2 is 4000 (MΩ) in the correction table Tm and reads the correction amount ΔpHq for the case where the pH value Q is 6.3.

Then, when the correction amount ΔpHq is 0.01, the determination unit 12b determines 6.36, which is obtained by adding 0.01 to the pH value Q of 6.35, as the corrected pH value and outputs the corrected pH value.

The correction table Tm stored in the storage unit 12d may be updated (rewritten) by performing the measurement of the resistance value R2c2 of the fixation layer 2c2 again by using the reference test solution as maintenance when usage time of the pH meter 51 reaches predetermined time.

The pH meter 51 (51A) includes the glass electrode 2 (35) in which the thin circular plate shaped glass membrane portion 2a (35a) is fixed to the base body 2b (35b) by the fixation layer 2c2 (35c). Moreover, the pH meter 51 (51A) includes the correction unit 12c which corrects the individual difference in the measurement system occurring due to this structure if the individual difference should occur. Accordingly, the pH meter 51 (51A) can perform highly accurate measurement.

Whether the pH value Q is to be corrected or not is desirably determined depending on the display resolution of the pH meter 51 (51A) and a combined resistance value difference ΔR.

The embodiment of the present invention is not limited to the configurations and steps of Example 1 (Example 2) and can be changed within a scope not departing from the spirit of the present invention.

Although the example of using the dispenser 21 is described as the method of applying the glass paste 2c to the base body 2b (35b) of the glass electrode 2 (35), the glass paste 2c may be applied by using other methods such as screen printing.

Although description is given of the example in which the low-temperature sintering type glass paste is used as the fixation layer 2c2 (35c) used to sealingly attach the glass membrane portion 2a (35a) and the base body 2b (35b) to each other, a low-temperature sintering type glass tablet or the like may be used. In this case, the glass tablet is formed in advance by pressure-forming low-melting point glass frit into an annular shape corresponding to the shape of the end surface 2b1 (35b1) of the base body 2b (35b) and the formed glass tablet is sintered while being placed on the end surface 2b1 (35b1) with the glass membrane portion 2a (35a) placed thereon.

The O-rings 6a to 6c can be any objects which can maintain water-tightness and are not limited to O-rings.

Although the base body 2b (35b) is described as an insulator in the description of Example 1 (Example 2), the base body 2b (35b) may be an object through which a current slightly flows, like the fixation layer 2c2 (35c).

Also in this case, the determination unit 12b determines the pH value by correcting the pH value based on the correction amount ΔpH for the pH value supplied from the correction unit 12c and this eliminates the effect of the base body 2b (35b) and enables obtaining of a highly-accurate pH value.

The base body 2b (35b) is a glass tube and can be practically considered as an insulator. Accordingly, as described above, it is desirable that the glass paste 2c is such a paste that the resistance value R2c2 of the fixation layer 2c2 (35c) after the sintering is equal to or higher than the resistance value Ra of the glass membrane portion 2a (35a).

In the fixation layer 2c2 (35c), the area in contact with the test solution S3 and the internal solution S2 of the reference electrode 37 is much smaller than that in the glass membrane portion 2a. Accordingly, the correction amount ΔpH is very small.

The correction may be unnecessarily depending on the required accuracy of the pH meter 51 (51A).

The determination unit 12a may output the measurement value as data to the outside wirelessly or through a wire, in addition to outputting the measurement value by displaying it on the display unit 1a1 (1Aa1).

As described above, the present invention includes various embodiments and the like which are not described herein as a matter of course. Accordingly, the technical scope of the present invention is determined only by the matters specifying the invention according to the claims regarded as appropriate from the aforementioned description.

INDUSTRIAL APPLICABILITY

According to the glass electrodes and the liquid property measurement devices in the aspects of the present invention, it is possible to provide a glass electrode and a liquid property measurement device which are less likely to break and easy to handle and which can achieve improvements in production efficiency and cost reduction.

EXPLANATION OF REFERENCE NUMERALS 1 case
1a main body portion
1a1, 1Aa1 display unit
1a2, 1Aa2 operation portion
1b stage portion
1b1 stage frame portion
1c test solution holding portion
1c1 bottom surface portion
2 glass electrode
2a glass membrane portion (sensitive glass body)
2a1 upper surface
2b base body
2b1 end surface
2c (2c1) glass paste
2c2 fixation layer
2d inner electrode
2d1 cable
2e sealing portion
3 liquid junction unit
3a upper surface
3b liquid junction portion
3c base body
3d absorbent cotton
3e bottom wall
5 electrode housing
5a peripheral wall portion
5b top wall portion
5b1 attachment hole
6a, 6b, 6c O-ring
7 bottom lid
7a attachment hole
7b sealing member
8 reference electrode
8a cable
11 circuit board
12, 12A calculation unit
12a measurement unit
12b determination unit
12c correction unit
12d storage unit
21 dispenser
22 test solution container
23 electrode
24 O-ring
31 electrode portion
33 cord
34 measurement main body portion
35 glass electrode
35a glass membrane portion (sensitive glass body)
35b base body
35b1 end surface
35c fixation layer
35e sealing portion
35d inner electrode
35d1 cable
36 annular tube portion
36a lower surface
36b liquid junction portion
36d absorbent cotton
36e sealing portion
37 reference electrode
37a cable
51, 51A pH meter (liquid property measurement device)
CLa axis
Q pH value
R combined resistance value
Ra, Rb, R2c2 resistance value
S1 glass electrode internal solution
S2 reference electrode internal solution
S3 test solution
S4 water
Tm correction table
Va, VAa glass electrode internal solution holding vessel
Vb, VAb reference electrode internal solution holding vessel
Vc interior space
ΔR combined resistance value difference

The invention claimed is:

1. A liquid property measurement device comprising:
a glass electrode including a flat sensitive glass body sensitive to ions, a base body formed of a glass tube housing an internal solution, and a fixation layer used to sealingly attach the sensitive glass body to an end surface of the base body; and
a processing circuit in communication with the glass electrode and configured to perform processing comprising:
correcting a cation concentration of a test solution obtained based on a potential of the glass electrode by using a correction value based on resistance values of the sensitive glass body and the fixation layer and output the corrected cation concentration as a measurement value, wherein
the liquid property measurement device is configured to measure the cation concentration of the test solution,
wherein the sensitive glass body is attached on the end surface of the base body such that a surface of the sensitive glass body is exposed to the internal solution, wherein the surface of the sensitive glass body that is exposed to the internal solution is sensitive to the ions, wherein the sensitive glass body and the base body are separated by the fixation layer which is formed from a low-temperature sintered glass paste arranged entirely between faces of the sensitive glass body and the end surface of the base body, and wherein the faces face in a direction toward each other and with the fixation layer interposed therebetween the faces.

2. The liquid property measurement device according to claim 1, wherein the resistance value of the fixation layer is equal to or higher than the resistance value of the sensitive glass body.

3. The liquid property measurement device according to claim 1, wherein the sensitive glass body is sensitive to hydrogen ions.

4. The liquid property measurement device according to claim 1, wherein the direction is parallel to a longitudinal direction of the base body, and in a radial direction, perpendicular to the longitudinal direction, external diameters of the base body and the sensitive glass body are equal.

* * * * *